United States Patent

[11] 3,602,156

| [72] | Inventor | Albert F. Verhoeven<br>Grand Rapids, Mich. |
|---|---|---|
| [21] | Appl. No. | 826,154 |
| [22] | Filed | May 20, 1969 |
| [45] | Patented | Aug. 31, 1971 |
| [73] | Assignee | Werner Lehara, Inc.<br>Grand Rapids, Mich. |

[54] DOUGH DEPOSITING MACHINE
9 Claims, 7 Drawing Figs.

[52] U.S. Cl. ................................................... 107/27,
107/54
[51] Int. Cl. ............................................. A21c 11/16
[50] Field of Search .......................................... 107/27–29,
1, 54, 14; 118/13, 14, 16

[56] References Cited
UNITED STATES PATENTS

| 1,903,570 | 4/1933 | Kremmling ................. | 107/27 |
| 2,217,020 | 10/1940 | Jurgens et al. ................ | 107/27 X |
| 2,609,966 | 9/1952 | Henry ........................... | 107/27 X |
| 2,728,308 | 12/1955 | Nelson ......................... | 107/14 |
| 3,322,073 | 5/1967 | McKown et al .............. | 107/1 |

Primary Examiner—Louis K. Rimrodt
Attorney—Price, Heneveld, Huizenga & Cooper

ABSTRACT: This disclosure relates to depositing of flowable materials such as cookie dough, jams, and the like, the depositing being carried out by forcing the flowable material out through an effluent port of a hopper onto a continuous belt which is moved intermittently between each depositing cycle. A cam wheel and a cam follower finger intermittently force the flowable material out through the effluent port. The cam follower is shaped so as to create suction at the effluent port after the depositing cycle is completed.

PATENTED AUG 31 1971

INVENTOR
ALBERT F. VERHOEVEN

ATTORNEY

DOUGH DEPOSITING MACHINE

This invention relates to dough depositing. In one of its aspects it relates to the depositing of flowable materials such as cookie dough, jams, and the like wherein the flowable material is forced out through an effluent port and deposited onto a belt during a first time interval, and is withdrawn slightly during a second time interval to sever the deposited material from the undeposited material.

In the extrusion of candy, batter, cookie dough, and the like, it is necessary to sever the extruded material from the unextruded material in order to provide a clean break on the deposited material and to prevent the deposited material from smearing on the surface on which it has been deposited. Many depositing machines utilize a wire which moves across the bottom of the depositing cups to mechanically sever the dough or cookie batter. This type of severing mechanism is represented by Genich 2,969,026.

In many cases such as the depositing of configurated cookies, jams and the like, the mechanical severing is undesirable since the deposited material sticks to the severing mechanism.

I have now discovered a machine to deposit cookie dough, jams, candies and the like in which the depositing cycle is followed by a suction on the undeposited material to withdraw the undeposited material back into the extruder, thereby achieving a natural separation of the deposited and undeposited material.

By various aspects of this invention one or more of the following, or other, objects can be obtained.

It is an object of this invention to provide an improved dough depositing machine for cookies, jams, and the like, which machine effects positive separation between the deposited and undeposited material without the use of physical cutting means which distort the surface of the final product.

It is a further object of this invention to provided an improved dough depositing machine which achieves positive separation of deposited and undeposited material without the use of a separate cutting device.

Other aspects, objects, and the several advantages of this invention are apparent to one skilled in the art from a study of this disclosure, the drawings, and the appended claims.

According to the invention, there is provided a machine for intermittently depositing flowable material such as cookie dough, jams, candy batter and the like from a supply source. The machine has an effluent port for depositing the flowable material, and cam means forming pockets for collecting the flowable material from the supply source and delivering the same to the effluent port. Cam follower means are provided adjacent the effluent port and biased against the cam means so as to force the material within the pocket out through the effluent ports. The cam follower means is so shaped with relation to the cam means so as to force the material in the pockets out of the effluent port during a first time interval, and to draw the flowable material inwardly from the effluent port during a second time interval so as to sever the material which has passed from the effluent port from that material which still remains in the effluent port. The invention will now be described with reference to the accompanying drawings in which:

Figure 1:
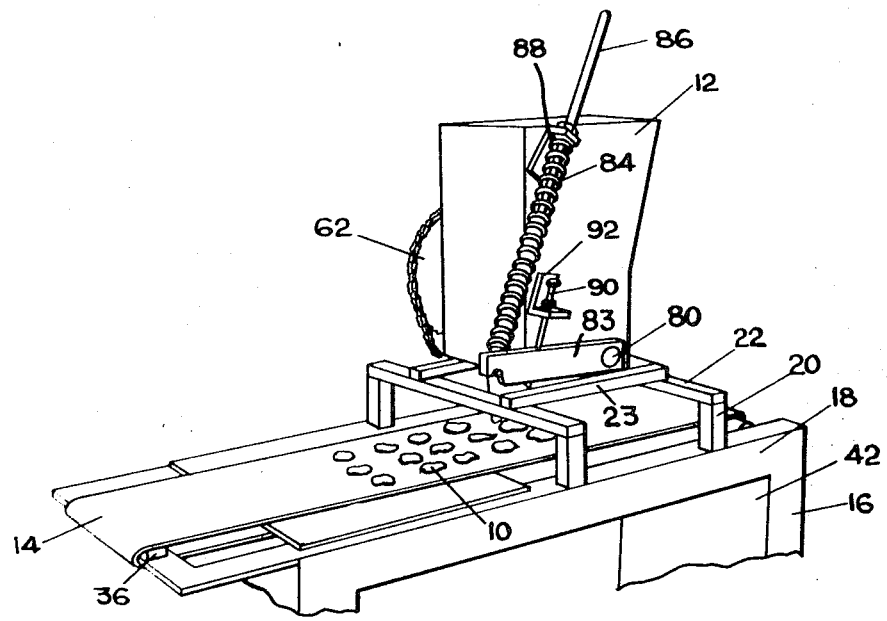
FIG. 1 is a perspective view of the dough or jam depositing machine.
Figure 2:
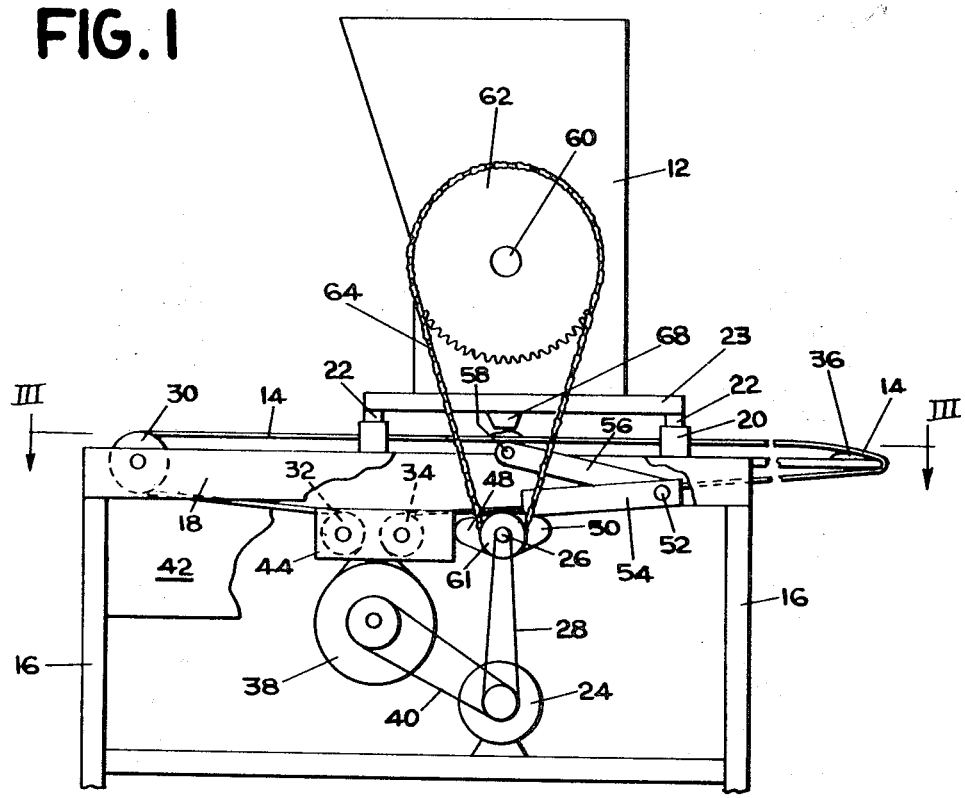
FIG. 2 is a side elevational view, partly in section, of the machine illustrated in FIG. 1, the view being taken from the opposite side than that seen in FIG. 1.

Referring now to the drawings, cookie dough 10 is deposited on a conveyor belt 14 from a hopper 12. The hopper is supported by base uprights 16 and base horizontal supports 18. The hopper is supported on the base by post 20 and cross members 22 and 23.

Figure 3:
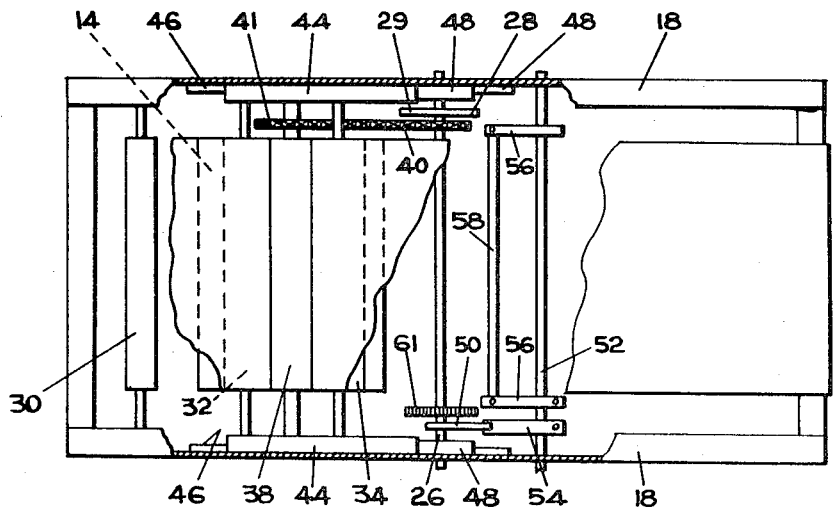
FIG. 3 is a plan view taken along lines III—III of FIG. 2.

A motor 24 is mounted on the base and drives the cam shaft 26 through a chain 28 and sprocket 29 on the cam shaft 26. The belt 14 engages idler rollers 30, 32, and 34, bar 36, and drive roller 38. The motor drives the drive roller 38 through a chain 40 and a sprocket 41 (FIG. 3). The cam shaft 26 and the drive roller 38 are supported at either side of the machine by side plates 42.

The idler rollers 32 and 34 are journaled in slide bars 44 which are adapted to reciprocate horizontally in tracks 46 at either side of the supporting base. The slide bars are driven by an eccentric cam 48 which is fixed on the cam shaft 26.

A shaft 52 is journaled in the base horizontal supports 18 at either side of the base. A follower bar 54 is fixed on the shaft 52 and contacts an eccentric cam 50 which is mounted for rotational movement on the cam shaft 26. Arms 56 are fixed to the shaft 52 at one end and are connected by a cross arm 58 at the other end. The cross arm 58 is positioned beneath depositing cups 68 and beneath the top layer of belt 14.

A drive shaft 60 extends through the hopper 12. The drive shaft 60 has fixed thereto a sprocket 62 which is driven by a chain 64 and sprocket 61, the latter being fixed to cam shaft 26.

Figure 6:
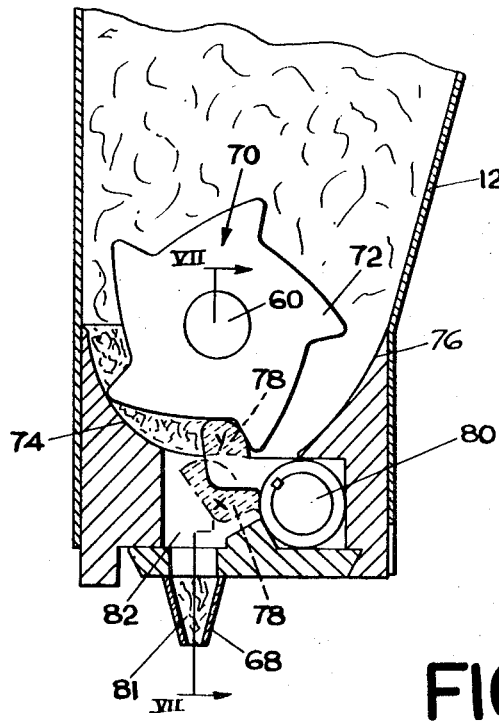
FIG. 6 is a side elevational view in section, of the dough depositing portion of the machine.
Figure 7:
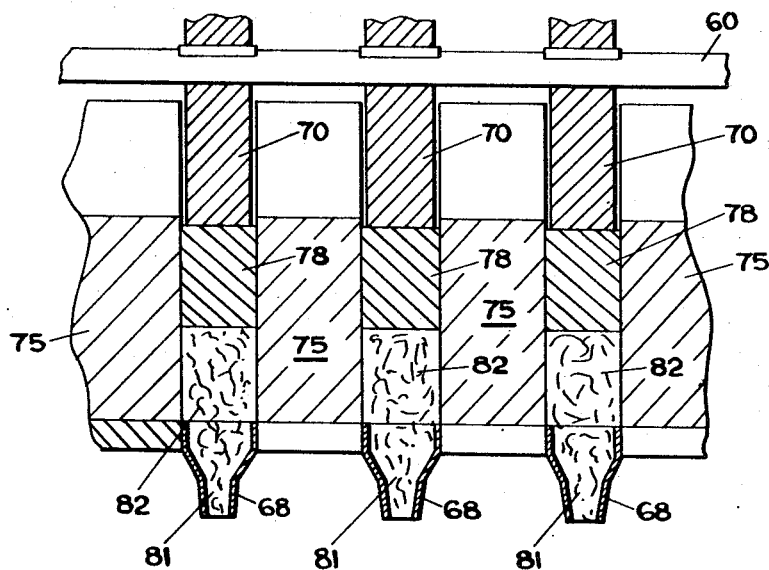
FIG. 7 is a sectional view taken along lines VII—VII of FIG. 6.

Reference is now made to FIGS. 6 and 7. At the bottom of the hopper 12, there is formed a plurality of dough delivering chambers 82 by cavity forming plates 74 and 76, and spacer plates 75. The dough delivering chambers 82 communicate with effluent ports 81 formed by depositing cups 68. The drive shaft 60 drives a plurality of cam wheels 70 which contain teeth or cam lobes 72. One side of the cam lobe 72 is gently sloping and the other side has a more radial angle forming a plurality of dough pockets with the cavity forming plates 74 and 76 and the spacer plates 75.

A cam follower finger is fixed to shaft 80 and bears against the outer surface of the cam wheel 70 to push dough from the dough pockets into a dough delivery chamber 82 and out depositing cups 68.

Referring now again the FIG. 1, the shaft 80 extends out of the side of hopper 12 and it is fixed to arm 83. A spring 84 is fixed at one end to arm 83 and at the other end to a rod 86 which is held by a flange 88. The flange 88 is fixed to the side of the hopper 12. In this manner, the cam finger 78 is biased against the cam wheel 70.

The extent to which the cam follower finger 78 can extend into the dough pockets is limited by an adjustable rod 90 which contacts the top of arm 83 and is fixed to a flange 92 which is in turn fixed on the side of hopper 12.

The operation of the machine will now be described. The intermittent moving of the belt can best be illustrated with reference to FIGS. 4 and 5. The drive roller 38 is driven at a constant speed. The belt 14 is rather loosely wound around the rollers and the bar 36. As the eccentric cams 48 push the slide bars 44 to the rear of the machine (to the left as viewed in FIGS. 4 and 5) the roller will turn the belt and cause movement of the belt in the direction illustrated by the arrow in FIG. 4. Further, the movement of the slide bars 44 and the idler rollers 32 and 34 towards the rear of the machine as indicated by the arrow in FIG. 4, the belt will move additionally due to the pulling of the belt over bar 36 by roller 34.

In other words, the movement of the belt during this portion of the cycle is due to both the movement of the drive roller 38 and the movement of the idler roller 34.

Figure 4:
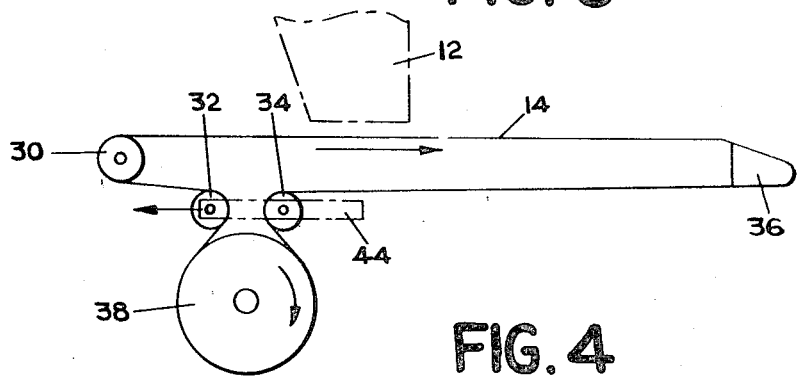
FIG. 4 and 5 are schematic illustrations of the operation of the intermittently moving conveyor belt.
Figure 5:
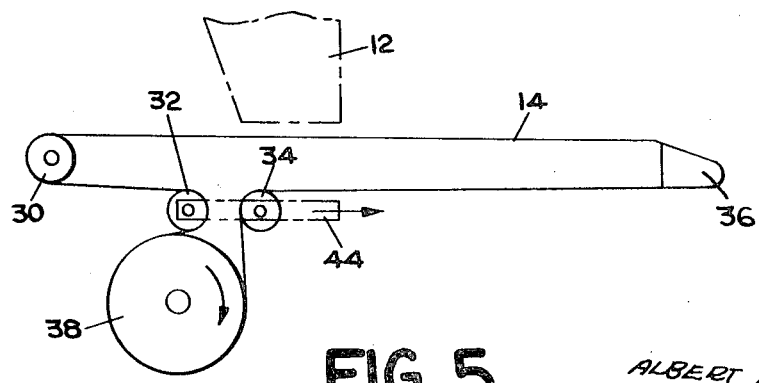

To illustrate this movement in still another way, if the idler rollers 32 and 34 were fixed, then the belt would move continuously in the direction of the arrow of FIG. 4 due to the pulling of the belt by the drive roller 38. On the other hand, if the roller 38 was a fixed roller, and the slide bars 44, containing the idler rollers 32 and 34 were moved to the rear of the machine (to left in FIG. 4) then the movement of the idler roller 34 would pull the belt around bar 36 and cause the top layer of the belt 14 to move in the direction shown by the arrow.

After the slide bars 44 have been moved to the left, they are released. Meanwhile the drive roller 38 continues to turn. As it turns, the roller 38 moves the slide bars 44 and the idler rollers 32 and 34 towards the forward end of the machine (to the right in FIG. 5) as indicated by the arrow in FIG. 5. When the slide bars 44 move to the forward end of the machine, the top layer of the belt 14 will remain stationary. The only portion of the belt which will move is that portion in contact with the roller 38. In other words, roller 32 takes up the slack generated by drive roller 38 during this portion of the cycle.

Thus, the belt moves intermittently while the drive roller 38 is turned continuously. The period of time during which the belt moves can be shorter or longer than the time in which the belt is stationary. The relative times of belt movement and stopping is controlled by the shape of the cams 48. The speed of the cycle is controlled by the speed of the cam shaft 26.

Each time the cam shaft turns, the cam 50 will raise and lower arms 56 and cross arm 58 to thereby raise and lower the top layer of belt 14 beneath the depositing cups. The raising and lowering of the belt is timed to correspond with the depositing of dough on the belt. Thus, when the depositing cycle is terminated, the belt is lowered away from the depositing cups 68 to aid in severing the dough or other material which has been deposited from that which is still in the depositing cup 68.

The dough is pushed out of the depositing cups 68 by the cam follower finger 78 which in turn is driven by the outer surface of the cam wheel 70. The shape of the cam follower finger 78 is such that a suction will be created in depositing cup 68 following the depositing portion of the cycle. This suction in the depositing cups is desirable to sever the deposited material from the undeposited material.

The suction created by the shape of the cam follower finger 78 can be illustrated with reference to FIG. 6. At the end of the dough depositing cycle, the cam finger 78 will be in the position illustrated by the phantom lines in FIG. 6. Shortly thereafter, the rotation of the cam wheel 70 will permit the cam follower finger 78 to move into the position shown in solid lines in FIG. 6. During this movement, no dough will be pushed through the depositing cups 68. As the cam follower finger moves into the pocket in the cam wheel 70, it will displace dough within the pocket. The amount of dough displaced is represented by the area Y illustrated by shaded dotted lines in the full line cam follower finger 78. The amount of space available for this displaced dough is represented by the area X shown in dotted shaded lines in the phantom line cam follower finger 78. If the difference between area X and area Y is greater than zero then there will be a void created within the dough delivery chamber 82. The cam follower finger is so shaped so as to make the difference between X and Y positive so as to create a suction within the delivery chamber 82. This suction draws the dough upwardly from the depositing cups 68 to sever the dough in the depositing cups from that which has been already deposited on the belt 14.

The amount of dough deposited on the belt 14 can be adjusted by changing the extent to which the cam follower finger 78 enters the pocket within the cam wheel 70. This extent is controlled by adjustable rod 90 which provides a stop for arm 83 as it moves upwardly. As has been disclosed hereinbefore, the arm 83 is fixed to shaft 80 in which shaft the cam follower finger 78 is keyed.

The movement of the belt is synchronized by the cam shaft and cam arrangement so as to correspond with the upward movement of cam follower finger 78 into the pockets of the cam wheel 70. Further, the upward movement of the cam follower finger 78 is synchronized with the downward movement of the arms 56 so that the belt 14 is drawn away from the depositing cups 68 at the same time that the upward suction is present within the depositing cups. This action provides a positive severing of the dough in the depositing cups from that dough which has been deposited on the belt.

With the use of the machine, very soft dough such as cookie dough, or other fluid material such as jams, can be deposited on the belt. When jams are deposited, the depositing machine can work in conjunction with other dough depositers so that the jam is deposited in cookies which have been formed in another machine.

Whereas the invention has been described with reference to a particular dough depositing machines and a mechanism for intermittently moving the belt beneath the depositing machine, it is within the scope of the invention to employ the dough depositing machine with a mechanism in which the belt moves continuously and the depositing mechanism reciprocates as it deposits dough on the continuously moving belt.

Whereas the invention has been described with the depositing of dough onto a belt, it is within the scope of the invention to deposit the dough, jams and the like onto cookie sheets supported by a belt wherein the sheets are removed from the belts and placed into an oven to bake the cookies.

Reasonable variation and modification are possible within the scope of the foregoing disclosure and drawings without departing from the spirit of the invention.

I claim:

The embodiments of the invention in which an exclusive property or privilege is claimed are defined as follows.

1. In a machine for intermittently depositing flowable material such as cookie dough, jams, candy batter and the like, from a supply source, said machine comprising:
   an effluent port;
   cam means forming pockets for collecting said flowable material from said supply source and delivering the same to said effluent port;
   cam follower means adjacent said effluent port and biased against said cam means so as to force material in said pockets out through said effluent port;
   the improvement which comprises:
   said cam follower means being so shaped as to force said material in said pockets out through said effluent port during a first time interval, and to draw material inwardly from said effluent port during a second time interval so as to sever the material which has passed from said effluent port from that material which still remains in said effluent port.

2. A machine according to claim 1 further comprising a plurality of effluent ports each being supplied with said flowable material from a cam and cam follower means to discharge said flowable material simultaneously from each of said discharge ports.

3. A machine according to claim 1 wherein said cam wheel comprises a rotary wheel having a plurality of pockets, each being formed by a gently sloping wall and a generally radial wall.

4. A machine according to claim 1 further comprising adjustable means limiting the extent to which said cam follower means moves into said pockets, thereby limiting the amount of said flowable material which is discharged from said flowable port.

5. A machine according to claim 1 further comprising a delivery chamber communicating with said effluent port and said rotary cam means.

6. A machine according to claim 1 further comprising a belt positioned below said effluent port to receive said flowable material forced from said effluent port; and means for driving said belt to move intermittently beneath said effluent port, said driving means being synchronized with said cam means to remain stationary during said first time interval and to move beneath said effluent port during said second time interval.

7. A machine according to claim 6 further comprising means to lift a portion of said belt beneath said effluent port during said first interval of time, and to lower said belt during said second interval of time to aid in severing that material which has passed from said effluent port from that material which remains in said effluent port.

8. In a method of depositing cookie dough and the like onto a belt from a hopper wherein the cookie dough is intermittently forced out through the depositing cups at the bottom of the hopper at a first interval of time, the improvement which comprises with drawing a predetermined amount of said cookie dough back into the depositing cups away from the belt to sever that dough which has been deposited on said belt from that dough which remains on said belt.

9. A method of depositing cookie dough and the like according to claim 8 further comprising the steps of raising said belt beneath said depositing cups during said first time interval and lowering said belts during said second time interval to aid in severing the dough.